US009159191B2

(12) United States Patent
Pacey

(10) Patent No.: US 9,159,191 B2
(45) Date of Patent: Oct. 13, 2015

(54) MASH-UP WAGERING GAME SYSTEM

(75) Inventor: Larry Pacey, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1087 days.

(21) Appl. No.: 12/741,617

(22) PCT Filed: Nov. 7, 2008

(86) PCT No.: PCT/US2008/012569
§ 371 (c)(1),
(2), (4) Date: May 6, 2010

(87) PCT Pub. No.: WO2009/061469
PCT Pub. Date: May 14, 2009

(65) Prior Publication Data

US 2010/0267446 A1 Oct. 21, 2010

Related U.S. Application Data

(60) Provisional application No. 60/986,701, filed on Nov. 9, 2007.

(51) Int. Cl.
*G06F 21/10* (2013.01)
*G07F 17/32* (2006.01)

(52) U.S. Cl.
CPC ............ *G07F 17/3237* (2013.01); *G07F 17/32* (2013.01)

(58) Field of Classification Search
USPC .............. 705/51, 16, 21, 59, 71; 380/44, 262, 380/278, 279
See application file for complete search history.

(56) References Cited

U.S. PATENT DOCUMENTS

| | | | | |
|---|---|---|---|---|
| 2004/0205147 | A1 * | 10/2004 | Fukuzato | 709/213 |
| 2006/0166729 | A1 * | 7/2006 | Saffari et al. | 463/17 |
| 2007/0111799 | A1 * | 5/2007 | Robb et al. | 463/42 |
| 2007/0155465 | A1 * | 7/2007 | Walker et al. | 463/16 |
| 2007/0204025 | A1 * | 8/2007 | Cox et al. | 709/223 |
| 2007/0208751 | A1 | 9/2007 | Cowan et al. | |

OTHER PUBLICATIONS

"International Application Serial No. PCT/US2008/012569, Search Report mailed Jan. 15, 2009", 4 pgs.
"International Application Serial No. PCT/US2008/012569, Written Opinion mailed Jan. 15, 2009", 7 pgs.
"International Application Serial No. PCT/US2008/012569, International Preliminary Report on Patentability mailed Aug. 4, 2010", 7 pgs.
"Australian Application Serial No. 2008325162, Response filed Jan. 10, 2013 to Subsequent Examiners Report mailed Dec. 10, 2012", 12 pgs.
"Australian Application Serial No. 2008325162, Subsequent Examiners Report mailed Feb. 8, 2013", 3 pgs.
"Australian Application Serial No. 2008325162, Subsequent Examiners Report mailed Dec. 10, 2012", 3 pgs.
"Australian Patent Serial No. 2008325162, Response Filed Nov. 15, 2012", 13 pgs.

* cited by examiner

*Primary Examiner* — Dante Ravetti
(74) *Attorney, Agent, or Firm* — Nixon Peabody LLP

(57) ABSTRACT

There is provided a mash-up method, system and machine-readable medium. Data associated with a wagering game network is obtained, at a first location. A determination is made whether to mash up the data. A presentation associated with the obtained data is selectively obtained based on the determination. The obtained data is mashed-up with the obtained presentation. The mashed-up presentation is transmitted for display to a display device associated with one or more patrons.

18 Claims, 9 Drawing Sheets

900

MASH-UP WAGERING GAME SYSTEM

RELATED APPLICATIONS

This patent application is a U.S. National Stage Filing under 35 U.S.C. 371 from International Patent Application Serial No. PCT/US2008/012569, filed Nov. 7, 2008, and published on May 14, 2009, as WO 2009/061469 A1, which claims the priority benefit of U.S. Provisional Patent Application Ser. No. 60/986,701 filed Nov. 9, 2007 and entitled “MASH-UP WAGERING GAME SYSTEM”, the content contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008, WMS Gaming, Inc.

TECHNICAL FIELD

This application relates generally to wagering game systems. More particularly, example embodiments are directed to a mash-up wagering game system to mash-up wagering game events and associated information with presentations associated with the wagering game events and associated information.

BACKGROUND

Wagering game machine developers continually provide new and entertaining games. One way of increasing entertainment value and maintaining player interest associated with casino-style wagering games (e.g., video slots, video poker, video black jack, and the like) includes offering a variety of base games and bonus events.

Another way of increasing the entertainment value and maintaining player interest is to update wagering game of wagering game machines with new game themes, game settings, bonus events, game software, and other electronic data. Yet another way of increasing the entertainment value and maintaining player interest is the display the size of the jackpot that may be possibly won and to displaying a variety of recent wins in the foregoing wagering games.

Multiple disparately located casinos have joined some of their wagering games together to offer players opportunities at bigger jackpots across the gamut of wagering games at the disparate casinos. Different displays have been provided to entice players to participate. However, despite the breadth of wagering games and ever greater jackpots, players may still lose interest in repetitive wagering gaming content and jackpot displays. In the competitive wagering game machine industry, there is a continuing need for manufacturers to enhance entertainment and excitement associated with wagering game machines.

SUMMARY

Example 1 describes a mash-up system, the system comprising a data obtaining module to obtain, at a first location, data associated with a wagering game network; a rules module to determine whether to mash up the obtained data; a presentation obtaining module to selectively obtain a presentation associated with the obtained data based on the determination; a mash-up module to mash-up the obtained data with the obtained presentation; a data transmission module to transmit the mashed-up presentation for display to a display device associated with one or more patrons.

In Example 2, the system of Example 1 is optionally configured such that the data obtaining module further receives a wagering game winning event or associated information.

In Example 3, the system of any one or more of Examples 1-2 are optionally configured such that the obtaining module further determines the associated information from a plurality of wagering game events.

In Example 4, the system of any one or more of Examples 1-3 are optionally configured such that wherein the presentation is selected from the group consisting of: a geographical map of at least one location, a floor map of one or more wagering game machines at a location; chart; and a patron’s photograph.

In Example 5, the system of any one or more of Examples 1-4 are optionally configured such that the mash-up module is further to mash-up the obtained data at a location of the obtained presentation associated with the obtained data.

In Example 6, the system of any one or more of Examples 1-5 are optionally configured such that the obtained data is selected from the group consisting of: a real time wagering game winning event; a historical wagering game winning event; frequency of wagering game winning events; non-occurrence of a wagering game winning event; location hot areas; demographics information; patron information; venue information; product information; actual payback percentages; marketing information; and promotional event information.

In Example 7, the system of any one or more of Examples 1-6 are optionally configured further comprising: a data transmission module to determine whether to share the obtained data with other locations, and the transmission module further to selectively transmit based on the determination the obtained data to a central location.

In Example 8, the system of any one or more of Examples 1-7 are optionally configured further comprising: a receive module to receive at the central location the transmitted data; a share determination module to determine whether the first location shares the received data with one or more other locations; and a transmission module to selectively transmit based on the determination the received data to the one or more other locations.

Example 9 describes a mash-up method, the method comprising: obtaining, at a first location, data associated with a wagering game network; determining whether to mash up the obtained data; selectively obtaining a presentation associated with the obtained data based on the determination; mashing-up the obtained data with the obtained presentation; and transmitting the mashed-up presentation for display to a display device associated with one or more patrons.

In Example 10, the method of Example 9 is optionally performed such that obtaining data further comprises receiving a wagering game winning event or associated information.

In Example 11, the methods of any one or more of Examples 9-10 are optionally performed such that obtaining data further comprises determining the associated information from a plurality of wagering game events.

In Example 12, the methods of any one or more of Examples 9-11 are optionally performed such that selectively obtaining comprises obtaining a presentation selected from the group consisting of: a geographical map of at least one location, a floor map of one or more wagering game machines at a location; a chart; and a patron's photograph.

In Example 13, the methods of any one or more of Examples 9-12 are optionally performed such that mashing-up comprises mashing-up the obtained data at a location of the obtained presentation associated with the obtained data.

In Example 14, the methods of any one or more of Examples 9-13 are optionally performed such that mashing-up comprises mashing-up the obtained data selected from the group consisting of a real time wagering game winning event; a historical wagering game winning event; frequency of wagering game winning events; non-occurrence of a wagering game winning event; location hot areas; demographics information; patron information; venue information; product information; actual payback percentages; marketing information; and promotional event information.

In Example 15, the methods of any one or more of Examples 9-14 are optionally performed comprising determining whether to share the obtained data with other locations and selectively transmitting based on the determination the obtained data to a central location.

In Example 16, the methods of any one or more of Examples 9-15 are optionally performed comprising receiving at the central location the transmitted data; determining whether the first location shares the received data with one or more other locations; and selectively transmitting based on the determination the received data to the one or more other locations.

Example 17 describes a machine-readable medium including instructions executable by a machine to perform a mash-up, the instructions causing the machine to obtain, at a first location, data associated with a wagering game network; determine whether to mash up the obtained data; generate a presentation associated with the obtained data based on the determination; mash-up the obtained data with the obtained presentation; and transmit the mashed-up presentation for display to a display device associated with one or more patrons.

In Example 18, the machine-readable medium of Example 17 optionally includes instructions causing the machine to obtain further comprise instructions to receive a wagering game winning event or associated information.

In Example 19, the machine-readable medium of any one or more of Examples 17-18 optionally include instructions causing the machine to obtain further comprise instructions causing the machine to determine the associated information from a plurality of wagering game events.

In Example 20, the machine-readable medium of any one or more of Examples 17-19 optionally include instructions causing the machine to generate comprises instructions causing the machine to generate a presentation selected from the group consisting of: a geographical map of at least one location, a floor map of one or more wagering game machines at a location; a chart; and a patron's photograph.

In Example 21, the machine-readable medium of any one or more of Examples 17-20 optionally include instructions causing the machine to mash-up comprises instructions causing the machine to mash-up the obtained data at a location of the generated presentation associated with the obtained data.

In Example 22, the machine-readable medium of any one or more of Examples 17-21 optionally include instructions causing the machine to mash-up comprises instructions causing the machine to mash-up the obtained data selected from the group consisting of: a real time wagering game winning event; a historical wagering game winning event; frequency of wagering game winning events; non-occurrence of a wagering game winning event; location hot areas; demographics information; patron information; venue information; product information; actual payback percentages; marketing information; and promotional event information.

In Example 23, the machine-readable medium of any one or more of Examples 17-22 optionally include instructions causing the machine to determine whether to share the obtained data with other locations; and selectively transmit based on the determination the obtained data to a central location.

In Example 24, the machine-readable medium of any one or more of Examples 17-23 optionally include instructions causing the machine to receive at the central location the transmitted data; determine whether the first location shares the received data with one or more other locations; and selectively transmit based on the determination the data to the one or more other locations.

This overview is intended to provide an overview of the subject matter of the present patent application. It is not intended to provide an exclusive or exhaustive explanation of the invention. The detailed description is included to provide further information about the subject matter of the present patent application.

BRIEF DESCRIPTION OF THE DRAWINGS

Embodiments are illustrated by way of example and not limitation in the figures of the accompanying drawings in which.

DETAILED DESCRIPTION

Figure 1:
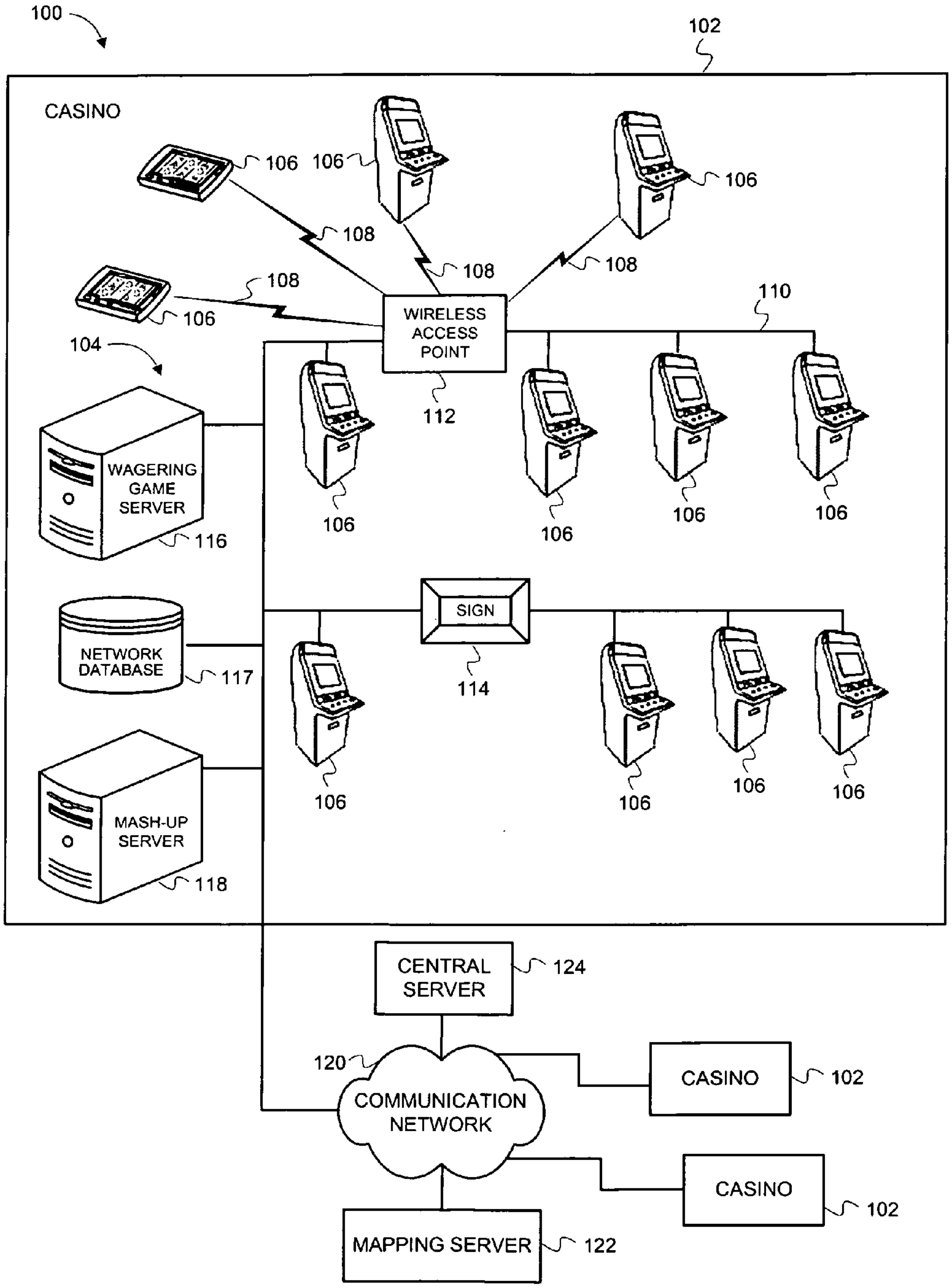
FIG. 1 is a block diagram of an example wagering game network adapted for mashing-up internally sourced data with a presentation associated with the internally sourced data.

FIG. 1 is block diagram of an example wagering game network 100 adapted to mash-up data from multiple sources, such as the wagering game network and/or Internet, into a single integrated tool. The combined or aggregated data may be presented to a casino patron via text and/or graphics. Data or content used in the mash-ups may be sourced internally from the wagering game network via a private interface or externally from a third party (e.g., web servers such as Google, Yahoo, Mapquest, and the like) via a public interface or API (e.g., Internet connection). Thus, the sources of data may be both internal to the wagering game network and external from the network. The wagering game network 100 may include a plurality of casinos 102 communicatively connected to a communications network 120. The communication network 120 may be any network, including the Internet, Wide Area Network (WAN), Metropolitan Area Network (MAN), Campus Area Network (CAN), Local Area Network (LAN), Home Area Network (HAN), wireless (802.11), satellite, as well as a variety of different combinations thereof. One or more of the plurality of casinos 102 may include a communication network 104 (e.g., LAN) that may include a wireless access point 112, wagering game machines 106, a wagering game server 116 to serve wagering games over the communication network 104 to the wagering game machines 106, network database 117 to store data associated with the wagering game network 100, and a mash-up server 118 to mash-up data from multiple sources.

Further with reference to FIG. 1 and as noted above, the data may come from both a source internal to the network, such as the network database 117, via a private interface and from a source external to the network, such as Internet web server, via a public interface or API (e.g., Internet connection). The mash-up server 118 may be coupled to the Internet web server directly or may communicate with another server that is, in turn, coupled to the Internet. The network database 117 may store data originating from any device on the network, including but not limited to the wagering game server 116, wagering game machines 106, and the central server 124 and may, for example, include real-time winning events, historical events, frequency of winning events, non-occurrence of a winning event, casino "hot areas", demographics, patron information, venue, product information, actual payback percentages, marketing and/or promotional events, casino floor maps, and the like. The external source, such as Google, Yahoo, Mapquest, and other web servers with location information, may provide data for geographic maps, for example. The mash-up server 118 may contain a module for generating graphical presentations of the aggregated data in the form of a histogram chart, a pie chart, a bar graph, or a line chart, casino floor map with overlaid data, geographical map with overlaid data, and the like and for transmitting such presentations to the wagering game machines 106 and/or signage or community display 114 in proximity to the machines 106. For example, the mash-up server 118 may overlay real-time winning event data internally sourced from the network database 117 onto a geographic map externally sourced from a web server (e.g., Google, Yahoo, Mapquest, and the like) on the Internet and cause this aggregated content to be displayed to patrons both in the casino where the winning event occurred and to be sent across the wide-area communication network 120 to other casinos 102. Based on a set of programmed rules, mash-up servers 118 at these other casinos 102 can then optionally cause the aggregated content to be displayed to patrons in their respective casinos 102.

Still further with reference to FIG. 1, although only one wireless access point 112 is depicted for clarity and brevity, it is to be noted that multiple wireless access points 112 may be provided The communication network 104 includes wireless communication links 108 and wired communication links 110 providing connections to wagering game machines 106 over the communication network 104. The wired and wireless communication links 108, 110 may employ any suitable connection technology, such as wireless (802.11), Ethernet, public switched telephone networks (PSTN), and the like. The wagering game server 116 may serve wagering games and/or distribute content to wagering game machines located in other casinos 102 (or at other locations) communicatively connected via the communications network 120. The wagering game machines 106 described hereinabove may take any suitable form, such as floor standing models, handheld mobile units, bartop models, workstation-type console models, and the like. An example floor standing model and an example mobile unit will be described below. Furthermore, the wagering game machines 106 may be primarily dedicated for use in conducting wagering games, or may include non-dedicated devices, such as mobile phones, personal digital assistants, personal computers, and the like. The wagering game network 100 may also include other network devices, such as accounting servers, wide area progressive servers, player tracking servers, and/or other devices suitable for use in connection with the example embodiments herein.

Yet further with reference to FIG. 1, the example wagering game network 100 includes a central server 124 that receives data internally sourced from the wagering game network (e.g., a winning real-time event such as a jackpot for progressive wagering game, a frequency of winning events, a non-occurrence of a winning event, and the like) from the plurality of casinos 102 and data externally sourced from the Internet via a public interface (e.g., Internet connection). The external source may, for example, be a web server 122 (e.g., "mapping server") on the Internet that provides mapping data. Such a mapping server 122 may be provided by Google, Yahoo, Mapquest, and others. The mapping server 122 generates a map of a scale based on input parameters, such as a location of the casino presenting a wagering game event (e.g., wagering game winning event) and a location of the originating casino in which the wagering game event occurred. The central server 124 distributes (or shares) the data to the casinos to be mashed-up based on sharing criteria (e.g., rules) for sharing the sourced data, such as for example, whether an originating casino 102 associated with the winning event shares its wins, whether the originating casino 102 belongs to a group of casinos that share their wins amongst the casinos of the group, whether a winning amount associated with the winning event is of a particular predetermined amount, as well as other sharing criteria (rules) that may be envisioned or designed to share data with the casinos 102. While it is envisioned that the mash-up server 118 at a casino generates graphical presentations of aggregated data for display to patrons within the casino and for transmission to other casinos, the central server 124 may additionally or alternatively act as a mash-up server that operates on the data it obtains. As mentioned above, the mash-up server 118 of a particular casino 102 may mash-up data and generate graphical presentations for display to patrons at the wagering game machines 106 and/or signage 114 of the casino 102. The signage 114 may, for example, be located at various banks of machines 106 throughout the casino 102.

Figure 2:
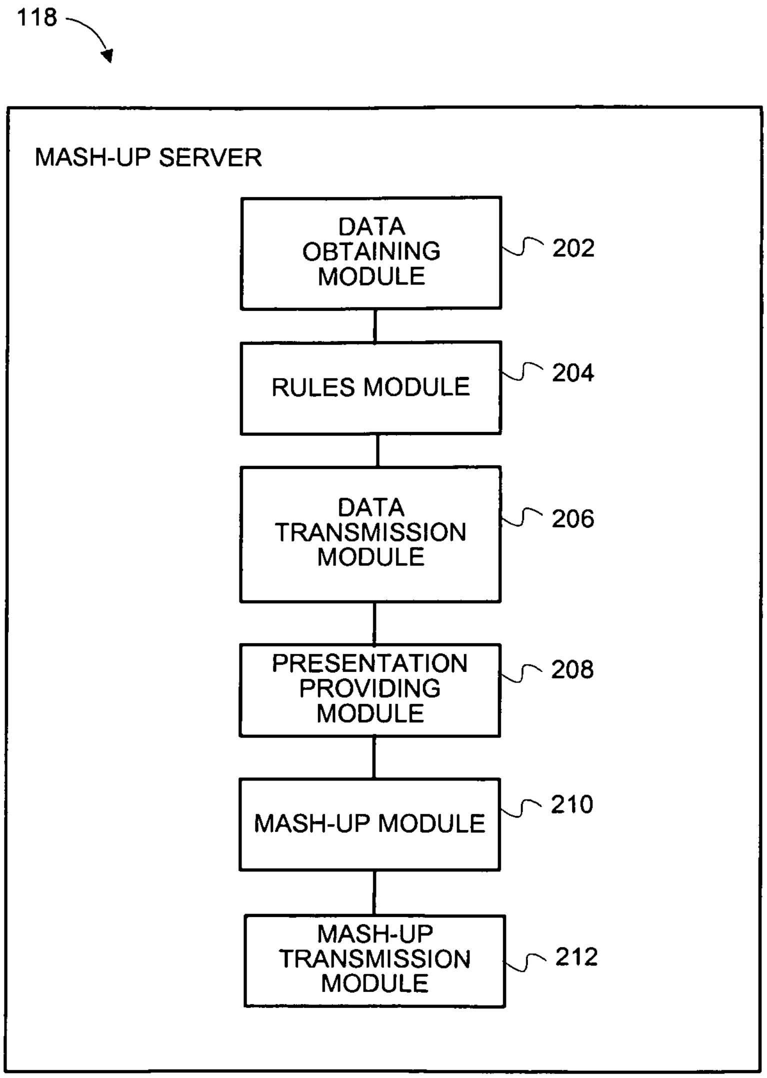
FIG. 2 is a block diagram of an example mash-up server in accordance with FIG. 1.

FIG. 2 is a block diagram of an example mash-up server 118 in accordance with FIG. 1. The mash-up server 118 includes a data obtaining module 202, a mash-up rules module 204, a wagering game event and associated information transmission module 206, a presentation module 208, a mash-up module 210, and a mash-up transmission module 212. The data obtaining module 202 obtains internally sourced data. More specifically, the data obtaining module 202 may receive or read wagering game events (e.g., winning event) and/or determine associated information (e.g., frequency of winning events) from the network database 117, which maintains wagering game events and associated information from the wagering game server 116 that may serve a wagering game to the wagering game machines 106, from the wagering game machines 106, and from the central database 124 that may distribute wagering game events and associated information from other casinos 102. More specifically, the mash-up rules module 204 includes a plurality of rules that facilitate the mash-up rules module 204 in filtering the received or read wagering game events (e.g., real-time wagering game events) that should be mashed-up and presented (e.g., a winning event with an award amount over $100,000). The mash-up rules module 204 further instructs the data obtaining module 202 to comb or search the network database 117 to obtain or determine other associated information (e.g., historical information) that should be mashed up and presented (e.g., a "big event" community event occurred 30 minutes ago, no "big event" occurred in the last 24 hours, 3 royal flushes occurred in the last 2 hours, or the like).

Further with reference to FIG. 2, the data transmission module 206 determines whether to transmit to the central server 124 the data determined by the mash-up rules module 204 for mash-up and presentation. For example, a wagering game event (e.g., real-time winning event) originating from the wagering game server 116 or wagering game machine 106 and stored in network database 117 may be transmitted to the central server 124 over networks 104, 120. As another example, information (e.g., historical events, frequency of winning events, non-occurrence of a winning event, casino "hot areas", demographics, patron information, venue, product information, actual payback percentages, marketing and/or promotional events, and the like) determined by mash-up rules module 204 from the network database 117 may also be transmitted to the central server 124 over networks 104, 120.

Still further with reference to FIG. 2, the presentation providing module 208 may provides a presentation (e.g., geographic map, floor map, chart and the like) associated with the data to be mashed up and presented. The presentation providing module 208 may generate the presentation (e.g., chart), may read an internally sourced presentation (e.g., casino floor map), or may obtain an externally sourced presentation (e.g., geographic map) from mapping server 122. In a chart presentation embodiment, the presentation providing module 208 may itself provide charting functionality or may call a process to generate a chart (e.g., histogram, pie chart, bar graph, line chart, and the like). In a casino floor map presentation embodiment, the presentation providing module 208 may obtain or read a floor map of the casino 102 from network database 117. In a geographic mapping presentation embodiment, the presentation providing module 208 may transmit the location (e.g., address, latitude and longitude, and the like) of an originating casino 102 that has generated the data (e.g., wagering game winning event) and optionally a location (e.g., address, latitude and longitude, and the like) of a casino 102 associated with the presentation of the data, to a mapping server 122 for generating a map for the locations. However, if the locations are the same, the location of the originating casino may be transmitted. It is noted that instead of using a mapping server 122, a mapping CD may that is locally available (not shown) to the mash-up server 118 may be used in a similar fashion to provide a geographic map. In either case, the presentation providing module 208 obtains a map of the transmitted location(s).

Yet further with reference to FIG. 2, the mash-up module 212 mashes-up (combines, aggregates, incorporates, inserts or overlays) the obtained internally sourced data (e.g., winning event information, historical winning event information, frequency of winning events information, non-occurrence of a winning event information, casino "hot areas" information, marketing and/or promotional event information, and the like) with the presentation obtained by the presentation obtaining module 208, which as described above, may include externally sourced data. For example, a wagering game event (e.g., winning event) may be mashed with the originating casino on the geographic map. The mash-up transmission module 212 transmits the mashed-up presentation to wagering game machine 106 and/or signage 114 for display. The mashed-up internally sourced data may be displayed in iconic, visual and/or text-based displays.

Figure 3:
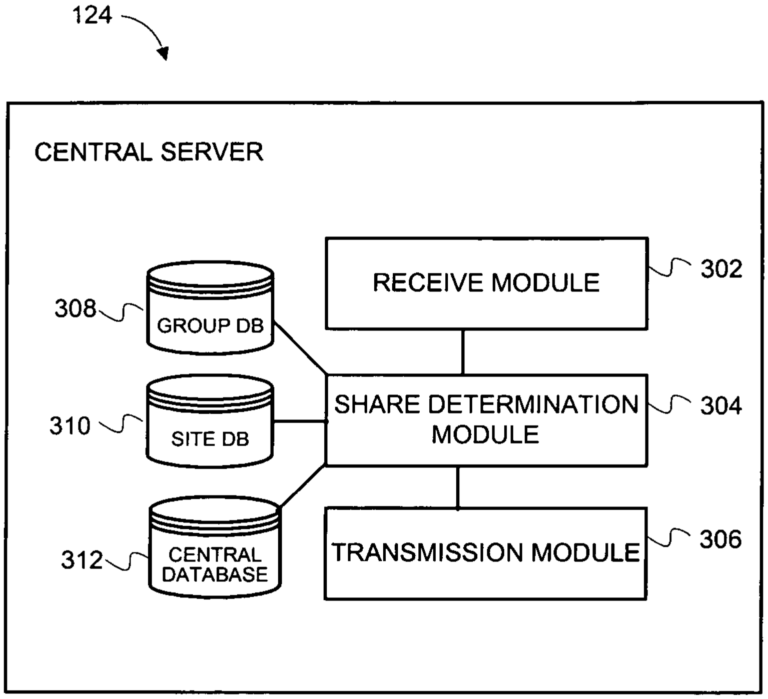
FIG. 3 is a block diagram of an example central server in accordance with FIG. 1.

FIG. 3 is a block diagram of an example central server 124 in accordance with FIG. 1. The central server 124 includes a receive module 302, a share determination module 304, and a transmission module 306. The receive module 302 receives internally sourced data, such as wagering game events and associated information from casinos 102 over network 120 for processing described in one example process below. The share determination module 304 determines distribution (or sharing) of the internally sourced data to the casinos 102 based on sharing criteria (rules). As it relates to a real-time winning event, sharing criteria may include whether an originating casino 102 associated with the winning event shares its wins, whether the originating casino 102 belongs to a group of casinos that share their wins amongst the casinos of the group, and whether a winning amount associated with the winning event falls into predetermined tiered amount categories. Other sharing criteria (rules) may be provided for a variety internally sourced data that may be shared amongst casinos 102. The transmission module 306 transmits or distributes the received internally sourced data to one or more casinos 102 over network 120 based on the sharing determination of the share determination module 304.

Further with reference to FIG. 3, the central server also includes a group database 308, a site database 310, and a central database 312. Whether the originating casino shares its internally sourced data (e.g., winning events) with other casinos is stored in site database 310. More specifically, the site database 310 stores a casino site ID that represents a particular casino, a casino group ID that represents a group to which the particular casino belongs, a flag representing whether the particular casino shares its internally sourced data (e.g., winning events), and a site name of the particular casino. Whether the casino group shares internally sourced data (e.g., winning events) with other casinos in the originating casino's group is stored in group database 308. More specifically, the group database stores the casino group ID, casino group name that represents casinos in that group, and a flag representing whether the casino group shares its internally sourced data (e.g., winning events) with other casinos in the originating casino's group. The central database 312 stored internally sourced data, such as wagering game events and associated information (e.g., winning real-time events, historical events, frequency of winning events, non-occurrence of a winning event, casino "hot areas", demographics, patron information, venue, product information, actual payback percentages, marketing and/or promotional events) received by the central server 124 from the casinos 102. More specifically, for data representing a winning event, the central database 312 may store a time stamp (including date and time), the casino site ID, winning event specific representation that may include a link ID that represents a progressive game that was triggered (e.g., Powerball™, Jackpot Party™ progressive, or the like) for the winning event and a theme ID that represents a theme (e.g., Dancing Dolphins™, Free Spin Maximus™) associated with link ID, and winning amount. Other data may also be included in the central database 312, such as player ID that represents a player associated with the winning event. A variety of data associated with different wagering game events and associated information may be stored in the central database 312.

Figure 4:
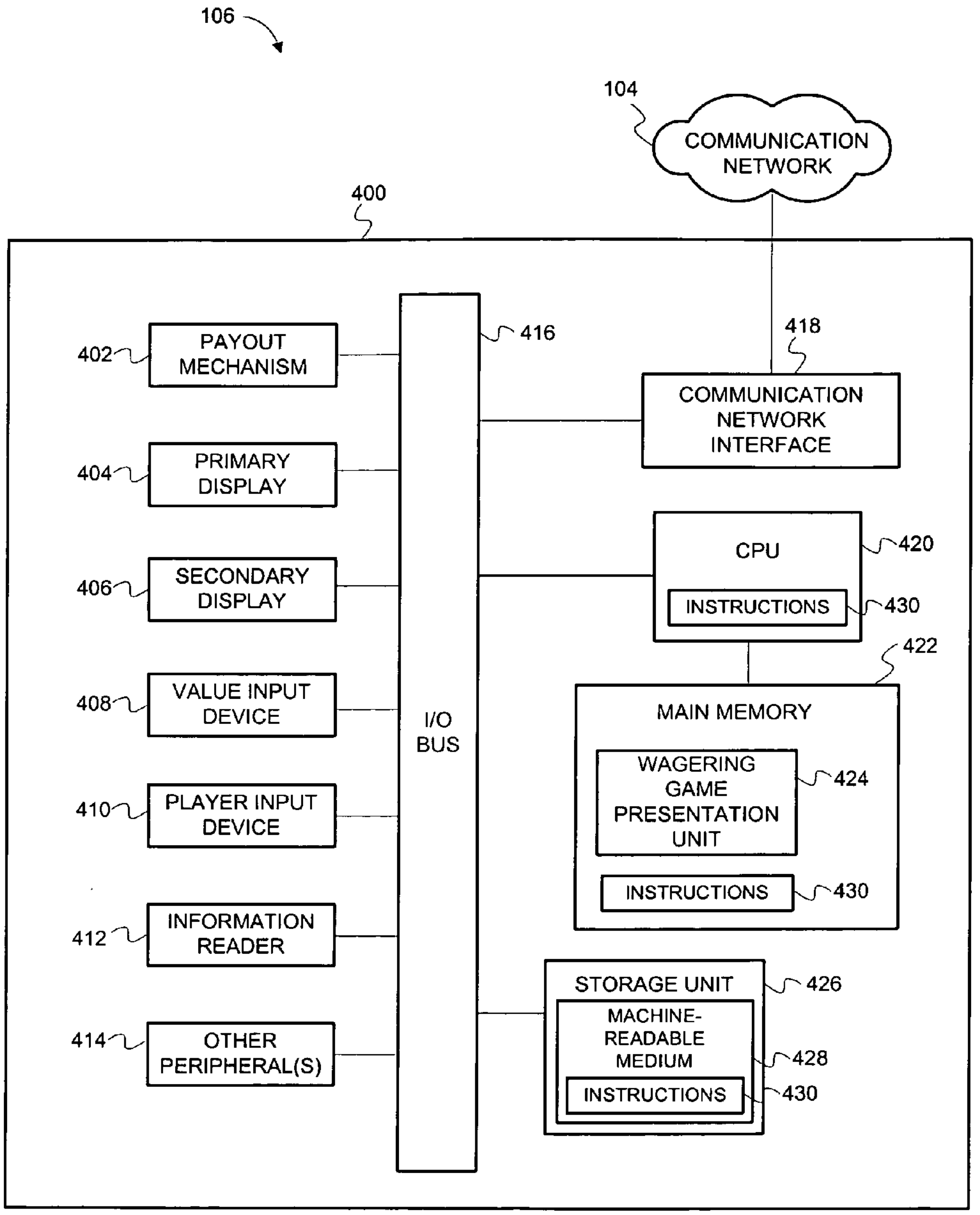
FIG. 4 is a block diagram of an example wagering game machine architecture of a wagering game machine in accordance with FIG. 1.

FIG. 4 is a block diagram of an example wagering game machine architecture 400 of a wagering game machine 106 in accordance with FIG. 1. The wagering game machine architecture 400 includes a central processing unit (CPU) or processor 420 communicatively connected to main memory 422, which includes a wagering game presentation unit 424. The wagering game presentation unit 424 may present wagering games, such as video poker, video black jack, video slots, video lottery, and the like, in whole or in part. The processor 420 is also communicatively connected to an input/output (I/O) bus 416, which facilitates communication between the processor 420 and other components of the wagering game machine architecture 400. The storage unit 426 may store the aforementioned wagering games for execution by the processor 420 and for presentation by the wagering game presentation unit 424. The I/O bus 416 is further communicatively connected to multiple peripheral devices including a payout mechanism 402, a primary display 404, secondary display 406, a value input device 408, a player input device 410, an information reader 412, and one or more other peripheral devices 414. It is to be noted that the peripheral devices may include a bill validator, a printer, a coin hopper, a button panel, or any of the many peripherals now found in wagering game machines or developed in the future. The player input device 410 may include the value input device 408 to the extent the player input device 410 is used to place wagers.

Further with reference to FIG. 4, the I/O bus 416 is communicatively connected to a communication network interface 418 that provides an interface to the wagering game machine architecture 400 (wagering game machine 106) for communication over a communication network 134. The communication network 134 may be any network, including the Internet, Wide Area Network (WAN), Metropolitan Area Network (MAN), Campus Area Network (CAN), Local Area Network (LAN), Home Area Network (HAN), wireless (802.11), satellite, as well as a variety of different combinations thereof. It is to be noted that the wagering game machine architecture 400 of wagering game machine 106 may include multiple communication network interfaces 418, as well as multiple processors 420. Any of the components of the wagering game machine architecture 400 that were described above may be integrated or subdivided.

Yet further with reference to FIG. 4, the wagering game machine architecture 400 includes instructions 430 for causing the wagering game machine architecture 400 of wagering game machine 106 to perform any one or more of the methodologies described herein. Furthermore, the storage unit 426 includes a machine readable medium 428 on which there is stored one or more sets of instructions and/or data structures (e.g., software 430) embodying or utilized by any one or more of the methodologies described herein. The software 420 may also reside, completely or at least partially, within the main memory 422 and/or within the processor 420 during execution thereof by the wagering game machine architecture 400, the main memory 422 and the processor 420 also constituting machine-readable media. The software 430 may further be transmitted or received over the communication network 134.

Figure 5:
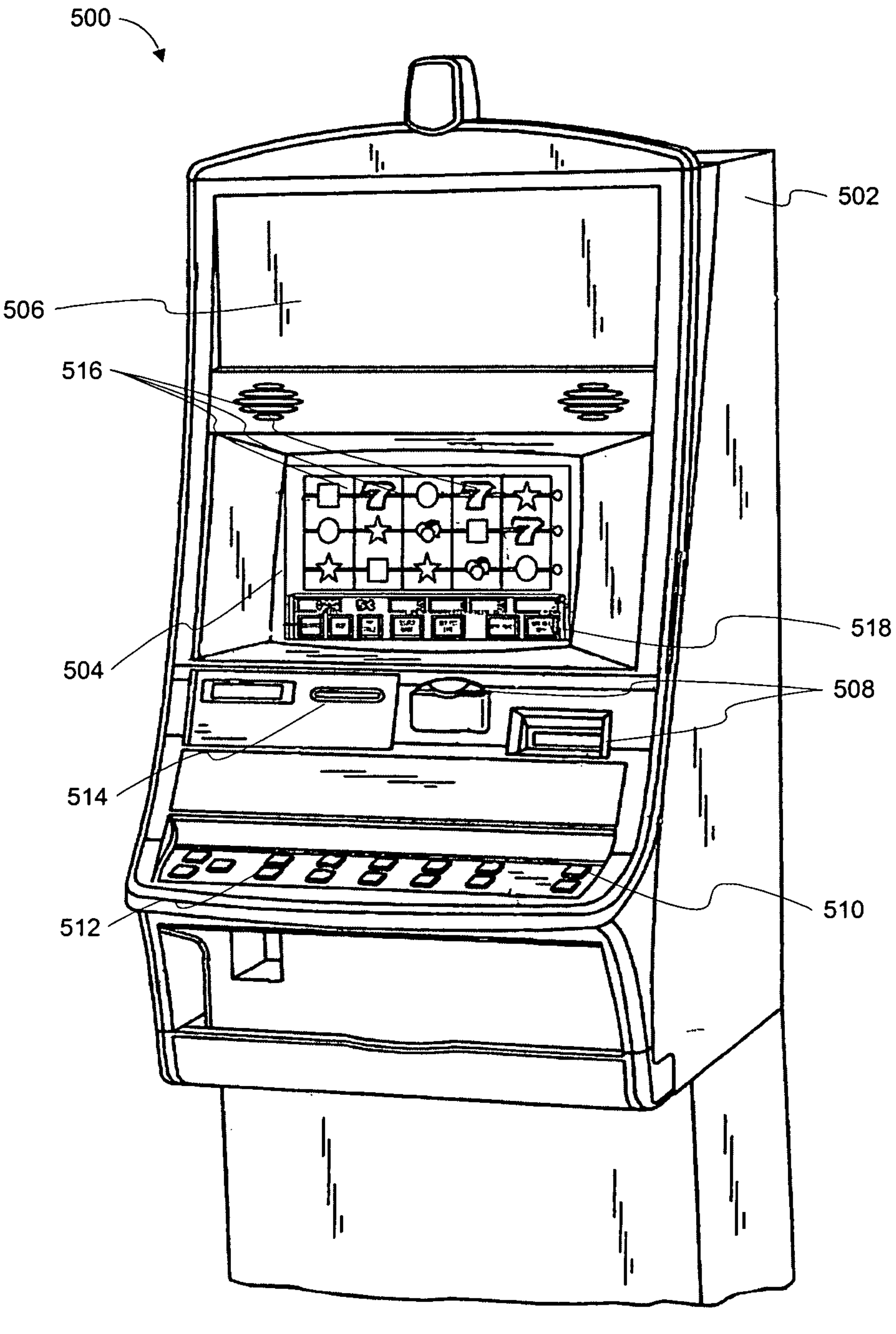
FIG. 5 is an example wagering game machine in accordance with FIGS. 1 and 4.

FIG. 5 is an example wagering game machine 500 in accordance with FIGS. 1 and 4. More specifically, FIG. 5 depicts a perspective view of a wagering game machine 500. The wagering game machine 500 is used in gaming establishments, such as casinos 102. The wagering game machine 500 may be any type of a wagering game machine and may have varying structures and methods of operation. One such structure was described hereinabove with reference to FIG. 4. For example, the wagering game machine 500 may be an electromechanical wagering game machine configured to play mechanical slots, or it may be an electronic wagering game machine configured to play video casino games, such as blackjack, slots, keno, poker, blackjack, roulette, and the like. The wagering game machine 500 includes a housing 502 and includes input devices, including value input devices 508 and a player input device 510. For output, the wagering game machine 500 includes a primary display 504 for displaying information about a basic wagering game. The primary display 504 may also display information about a bonus wagering game and a progressive wagering game. The wagering game machine 500 also includes a secondary display 506 for displaying wagering game events, wagering game outcomes, signage information, and/or mash-up information. In accordance with FIGS. 1-4, the primary and/or secondary displays 504, 506 may display mashed up maps associated with wagering game winning events, such as jackpot winning events associated with the progressive wagering game. While some components of the wagering game machine 500 are described herein, numerous other elements may exist and may be used in any number or combination to create varying forms of the wagering game machine 500.

Further with reference to FIG. 5, the value input devices 508 may take any suitable form and may be located on the front of the housing 502. The value input devices 508 may receive currency and/or credits inserted by a player. The value input devices 508 may include coin acceptors for receiving coin currency and bill acceptors for receiving paper currency. Furthermore, the value input devices 508 may include ticket readers or barcode scanners for reading information stored on vouchers, cards, or other tangible portable storage devices. The vouchers or cards may authorize access to central accounts, which may transfer money to the wagering game machine 500. The player input device 510 includes a plurality of push buttons on a button panel 512 for operating the wagering game machine 500. In addition, or alternatively, the player input device 510 may include a touch screen 518 mounted over the primary display 504 and/or secondary display 506. The various components of the wagering game machine 500 may be connected directly to, or contained within, the housing 502. Alternatively, some of the wagering game machine's components may be located outside of the housing 502, while being communicatively coupled with the wagering game machine 500 using any suitable wired or wireless communication technology. The wagering game machine 500 may also include an information reader 514, which may include a card reader, ticket reader, bar code scanner, RFD transceiver, or computer readable storage medium interface. The information reader 514 may be used to award complimentary services, restore game assets, track player habits, and the like.

Still further with reference to FIG. 5, the operation of the basic wagering game may be displayed to the player on the primary display 504. The primary display 504 may also display a bonus game associated with the basic wagering game. The primary display 504 may include a cathode ray tube (CRT), a high resolution liquid crystal display (LCD), a plasma display, light emitting diodes (LEDs), or any other type of display suitable for use in the wagering game machine 500. Alternatively, the primary display 504 may include a number of mechanical reels to display the outcome. In FIG. 5, the wagering game machine 500 is an "upright" version in which the primary display 504 is oriented vertically relative to the player. The wagering game machine may also be a "slant-top" version in which the primary display 504 is slanted at about a thirty-degree angle toward the player of the wagering game machine 500. It is to be noted that the wagering game machine 500 may exhibit any suitable form factor, such as a free standing model, bartop model, mobile handheld model, workstation console model, and the like.

Finally with reference to FIG. 5, a player begins playing a basic wagering game by making a wager via the value input device 508. The player may initiate play by using the player input device's buttons or touch screen 518. The basic game may include arranging a plurality of symbols along a payline 516, which indicates one or more outcomes of the basic game. Such outcomes may be randomly selected in response to player input. At least one of the outcomes, which may include any variation or combination of symbols, may trigger a bonus game.

Figure 6:
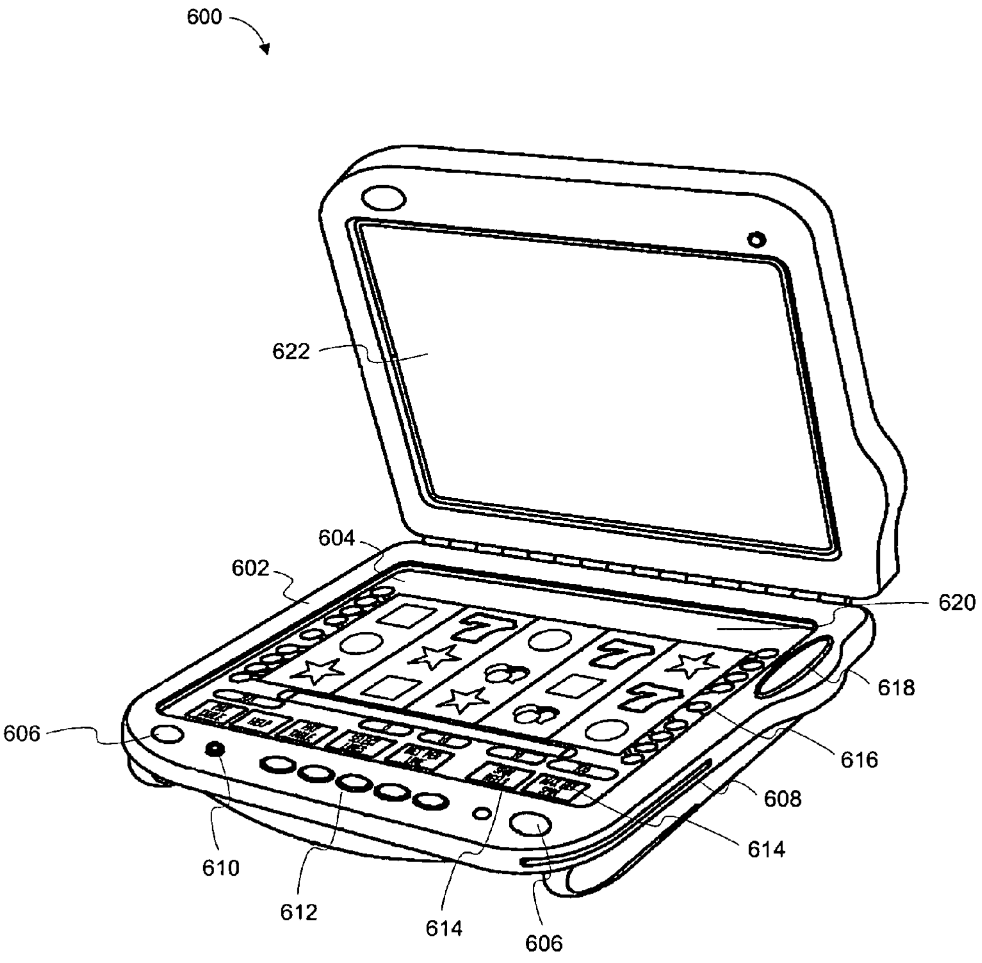
FIG. 6 is an example portable wagering game machine in accordance with FIGS. 1 and 4.

FIG. 6 is an example portable wagering game machine 600 in accordance with FIGS. 1 and 4. Like the free-standing wagering game 500 machine described with reference to FIG. 5 hereinabove, in a handheld or mobile form, the wagering game machine 600 may include any suitable electronic device configured to play video casino games such as blackjack, slots, keno, poker, blackjack, roulette, and the like. The wagering game machine 600 includes a housing 602 and includes input devices, including a value input device 608 and a player input device 612. For output, the wagering game machine 600 includes a primary display 604, a secondary display 622, one or more speakers 606, one or more player-accessible ports 610 (e.g., an audio output jack for headphones, a video headset jack, and the like), and other I/O devices and ports, which may or may not be player-accessible. The secondary display 622 may be rotatable, fixed, movable, and/or detachable/attachable relative to the primary display 604. Either the primary display 604 and/or secondary display 622 may be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, mashed up presentations associated internally sourced data (e.g., jackpot winning events associated with a progressive wagering game), and wagering game machine status.

Further with reference to FIG. 6, the player-accessible value input device 608 may include, for example, a slot located on the front, side, or top of the housing 602 configured to receive credit from a stored-value card (e.g., casino card, smart card, debit card, credit card, and the like) inserted by a player. The player-accessible value input device 608 may also include a sensor (e.g., an RF sensor) configured to sense a signal (e.g., an RF signal) output by a transmitter (e.g., an RF transmitter) carried by a player. The player-accessible value input device 608 may also or alternatively include a ticket reader, or barcode scanner, for reading information stored on a credit ticket, a card, or other tangible portable credit or funds storage device. The credit ticket or card may also authorize access to a central account, which may transfer money to the wagering game machine 600. Still other player-accessible value input devices 608 may require the use of touch keys 614 on the touch-screen display (e.g., primary display 604 and/or secondary display 622) or player input devices 612. Upon entry of player identification information and, preferably, secondary authorization information (e.g., a password, PIN number, stored value card number, predefined key sequences, and the like), the player may be permitted to access a player's account. As one potential optional security feature, the wagering game machine 600 may be configured to permit a player to only access an account the player has specifically set up for the wagering game machine 600. Other security features may also be utilized to, for example, prevent unauthorized access to a player's account, to reduce an impact of any unauthorized access to a player's account, or to prevent unauthorized access to any personal information or funds temporarily stored on the wagering game machine 600.

Still further with reference to FIG. 6, the player-accessible value input device 608 may itself include or utilize a biometric player information reader which permits the player to access available funds on a player's account, either alone or in combination with another of the aforementioned player-accessible value input devices 608. Transactions such as an input of value to the wagering game machine 600, a transfer of value from one player account or source to an account associated with the wagering game machine 600, or the execution of another transaction, for example, may all be authorized by one or more biometric readings from the biometric device. Alternatively, to enhance security, a transaction may be optionally enabled only by a two-step process in which a secondary source confirms the identity indicated by a primary source. For example, a player-accessible value input device 608 including the biometric player information reader may require a confirmatory entry from another biometric player information reader 618, or from another source, such as a credit card, debit card, player ID card, fob key, PIN number, password, hotel room key, and the like. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, and the like) may be utilized to provide enhanced security prior to the electronic transfer of any funds. In another aspect, the value input device 608 may be provided remotely from the wagering game machine 600.

Yet further with reference to FIG. 6, the player input device 612 includes a plurality of push buttons on a button panel for operating the wagering game machine 600. In addition, or alternatively, the player input device 612 may include a touch screen mounted to the primary display 604 and/or the secondary display 622. In one aspect, the touch screen is matched to a display screen having one or more selectable touch keys 614 selectable by a user's touching of the associated area of the screen using a finger or a tool, such as a stylus pointer. A player enables a desired function either by touching the touch screen at an appropriate touch key 614 or by pressing an appropriate push button on the button panel. The touch keys 614 may be used to implement the same functions as push buttons. Alternatively, the push buttons may provide inputs for one aspect of the operating the game, while the touch keys 614 may allow for input needed for another aspect of the game. The various components of the wagering game machine 600 may be connected directly to, or contained within, the housing 602, or may be located outside the housing 602 and connected to the housing 602 via a variety of wired (tethered) or wireless connection methods. Thus, the wagering game machine 600 may include a single unit or a plurality of interconnected (e.g., wireless connections) parts which may be arranged to suit a player's preferences.

Additionally with reference to FIG. 6, the operation of the basic wagering game on the wagering game machine 600 is displayed to the player on the primary display 604. The primary display 604 may also display the bonus game associated with the basic wagering game. The primary display 604 may be a high resolution liquid crystal display (LCD), a plasma display, a light emitting diode (LED) display, or any other type of display suitable for use in the wagering game machine 600. The size of the primary display 604 may vary from, for example, about a 2-3" display to a 15" or 17" display. The primary display 604 may be a 7"-10" display. Optionally, coatings or removable films or sheets may be applied to the display to provide characteristics (e.g., anti-scratch, anti-glare, bacterially-resistant and anti-microbial films, and the like). The primary display 604 and/or secondary display 622 may have a 16:9 aspect ratio or another aspect ratio (e.g., 4:3). It is to be noted that the primary display 604 and/or secondary display 622 may each have different resolutions, different color schemes, and different aspect ratios.

Finally with reference to FIG. 6, as with the free standing embodiments of the wagering gaming machine 500 of FIG. 5, a player begins play of the basic wagering game on the wagering game machine 600 by making a wager (e.g., via the value input device 608 or an assignment of credits stored on the handheld gaming machine via the touch screen keys 614, player input device 612, or buttons) on the wagering game machine 600. The basic game may comprise a plurality of symbols arranged in an array, and includes at least one payline 616 that indicates one or more outcomes of the basic game. Such outcomes may be randomly selected in response to the wagering input by the player. At least one of the plurality of randomly selected outcomes may be a start-bonus outcome, which may include any variations of symbols or symbol combinations triggering a bonus game. The player-accessible value input device 608 of the wagering game machine 600 may double as a player information reader 618 that allows for identification of a player by reading a card with information indicating the player's identity (e.g., reading a player's credit card, player ID card, smart card, and the like). The player information reader 618 may alternatively or also include a bar code scanner, RFID transceiver or computer readable storage medium interface. The player information reader 618 may also include a biometric sensing device.

Figure 7:
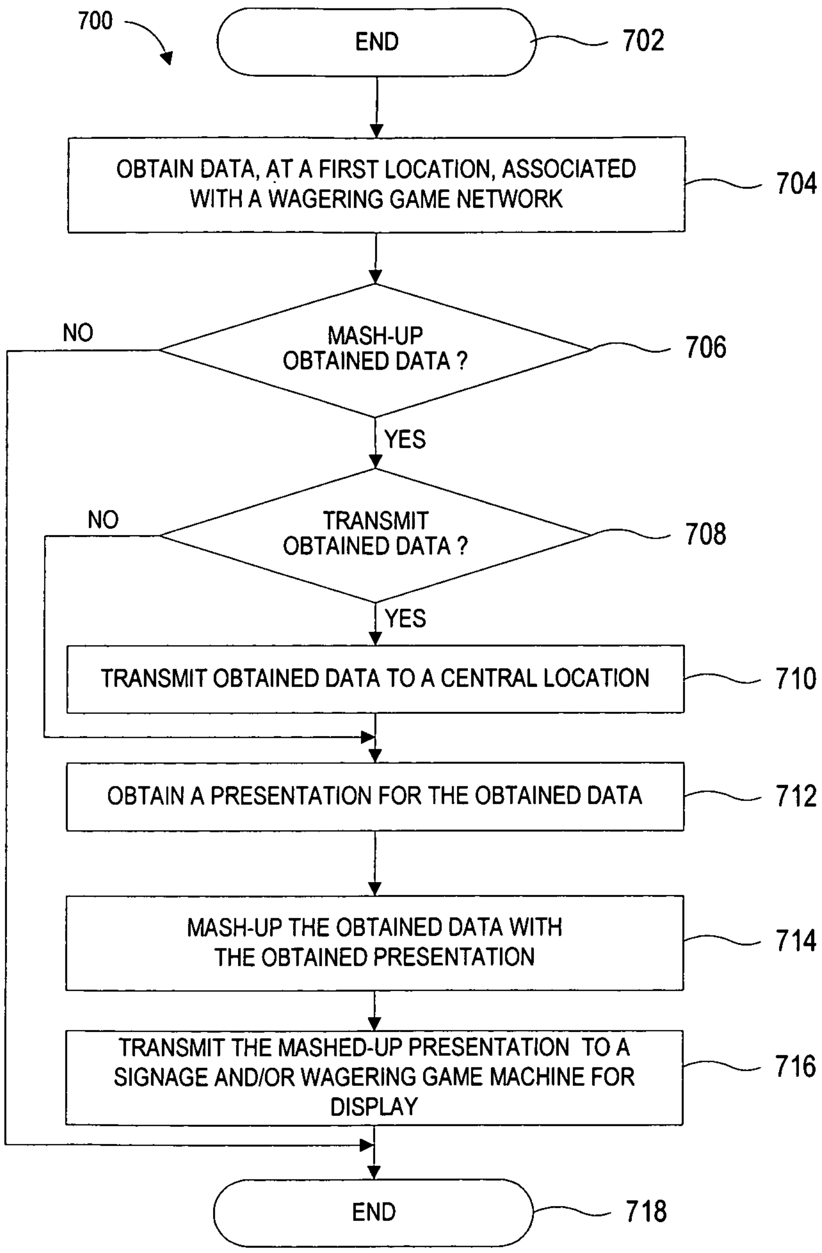
FIG. 7 is a flowchart illustrating an example method for mashing up data associated with the wagering game network with a presentation associated with the data performed by the mash-up server of FIG. 2.

FIG. 7 is a flowchart illustrating a method 700 for mashing data associated with a wagering game network 100 performed by the mash-up server 118 of FIG. 2. The method 700 starts at operation 702. At operation 704, the data obtaining module 202 of the mash-up server 118 obtains internally sourced data associated with the wagering game network 100 from the network database 117 at a first location 102. At operation 706, the mash-up rules module 204 determines whether to mash-up the obtained data. If it is determined that the obtained data is to be mashed up, the method 700 continues at operation 708, and if not, the method 700 continues at operation 718 where the method 700 ends. If the data is to be mashed up, the system determines how to combine or aggregate the data into a single presentation. At operation 708, the data transmission module 206 determines whether to transmit to the central server 124 the obtained data. If it is determined that obtained data is to be transmitted, the method 700 continues at operation 710, and if not, the method 700 continues at operation 712. Thus, at operation 710 the data transmission module 206 transmits the obtained data to the central server 124. At operation 712, the presentation obtaining module 208 obtains a presentation for obtained data (e.g., geographic map, casino floor map, chart, and the like). At operation 714, the mash-up module 210 mashes up the obtained data with the obtained presentation. At operation 716, the mash-up transmission module 212 transmits the mashed-up presentation to signage 114 and/or wagering gaming machine 106 for display to patrons. Thereafter the method 700 ends at operation 718.

It should be noted that data or content used in the mash-ups may be sourced internally from disparate sources on the wagering game network via a private interface or externally from a third party (e.g., web servers such as Google, Yahoo, Mapquest, and the like) via a public interface or API (e.g., Internet connection). Thus, the disparate sources of data may be both internal to the wagering game network and external from the network.

Figure 8:
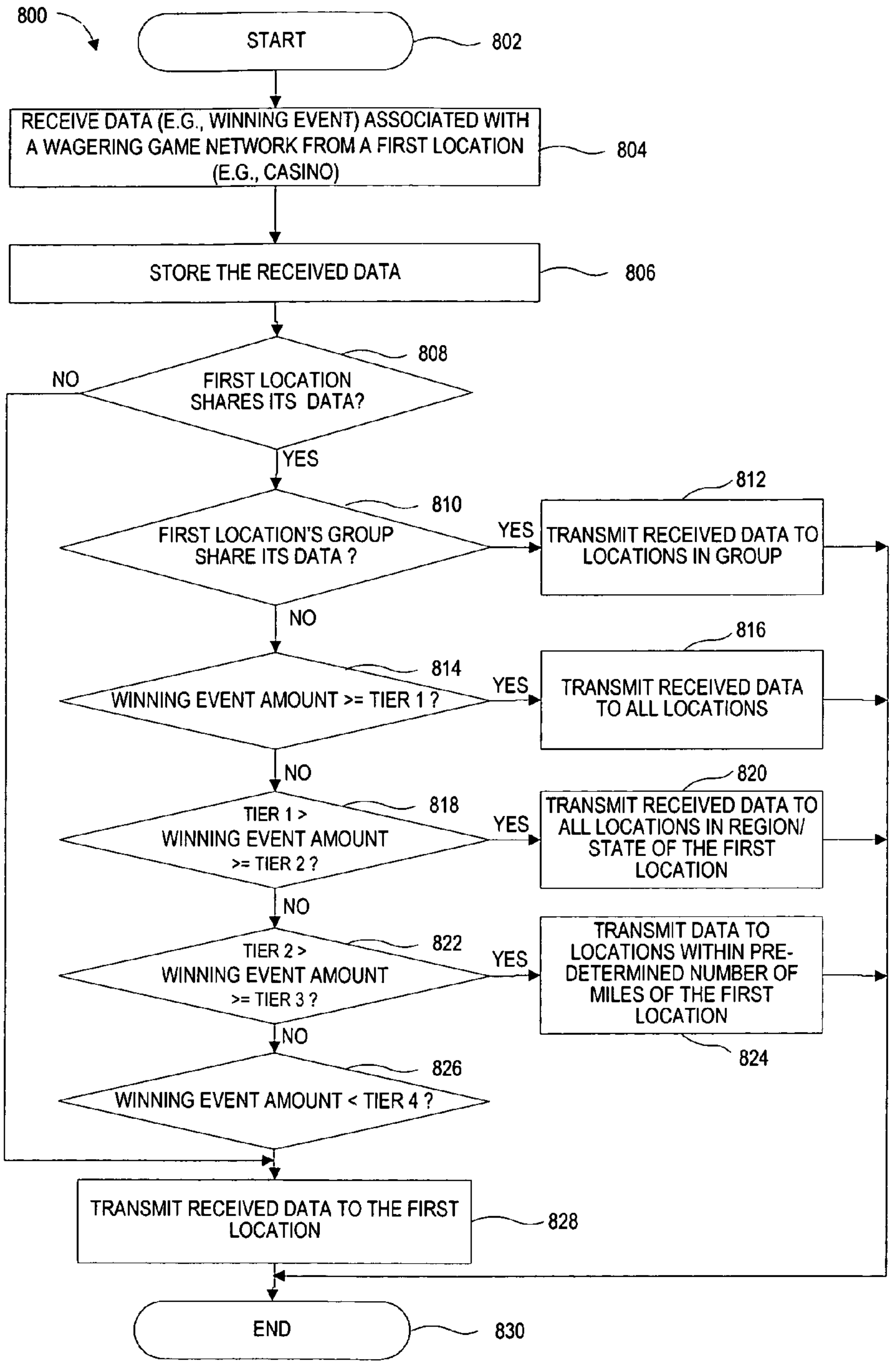
FIG. 8 is an example flowchart illustrating a method for distributing data (winning event) in the wagering game network performed by the central server of FIG. 3.

FIG. 8 is a flowchart illustrating an example method 800 for distributing internally sourced data (e.g., wagering game winning events) in the wagering game network 100 performed by the central server 124 of FIG. 3. The method 800 starts at operation 802. At operation 804, the receive module 302 receives internally sourced data (e.g., wagering game winning event) associated with a wagering game network 100 from a first location (casino 102) over network 120, and at operation 806, the receive module 302 stores the received data (e.g., wagering game winning event) in the central database 312. At operation 808, the share determination module 304 determines from the site database 310 whether the first location 102 shares its data with other locations (casinos 102). If it is determined that the first location does not share its data, the method 800 continues at operation 828 where the transmission module transmits the data back (e.g., wagering game winning event) to the first location (casino 102) that originated the winning event. Alternatively, if it is determined that the first location (casino 102) does share its data, the method 800 continues at operation 810 where share determination module 304 determines from the group database 308 whether other locations (casinos 102) in the first location's group share its data (e.g., wagering game winning event). If so, at operation 812, transmission module 306 transmits the received data to the locations (casinos 102) in the group obtained from the group database 308. If not, the method continues with operations 814-826 that override the share settings for the first location and first location's group. The following predetermined amount parameters for a wagering game winning event may be configured in the central server 124. Other parameters may be provided and tested for distributing or transmitting other data information to the locations (casinos 102).

Further with reference to operations 814-826 of FIG. 8, at operation 814, the share determination module 304 may determine whether a winning event amount of the data (winning event) is greater to or equal to a predetermined tier 1 amount (e.g., one million dollars). If so, at operation 816, the transmission module 306 transmits the data to all locations (casinos 102). At operation 818, the winning event share determination module 304 determines whether the winning event amount of the data is greater or equal to tier 2 (e.g., one hundred thousand dollars) and less than tier 1 (e.g., one million dollars). If so, at operation 820, the transmission module 306 transmits the data to all locations (casinos 102) in a region or state of the first location (casino 102). At operation 822, the share determination module 304 determines whether the winning event amount of the data is greater or equal to a tier 3 (e.g., ten thousand dollars) and less than tier 2 (e.g., one hundred thousand dollars). If so, at operation 824, the transmission module 306 transmits the data all locations (casinos 102) within a predetermined number of miles of the first location (casino 102). Lastly, at operation 826, the share determination module 304 determines whether the winning event amount of the data is less than a tier 4 (e.g., one thousand dollars). If so, at operation 828, the winning event transmission module 306 transmits the data only to the first location (casino 102) from which the data was received by the receive module 302.

Figure 9:
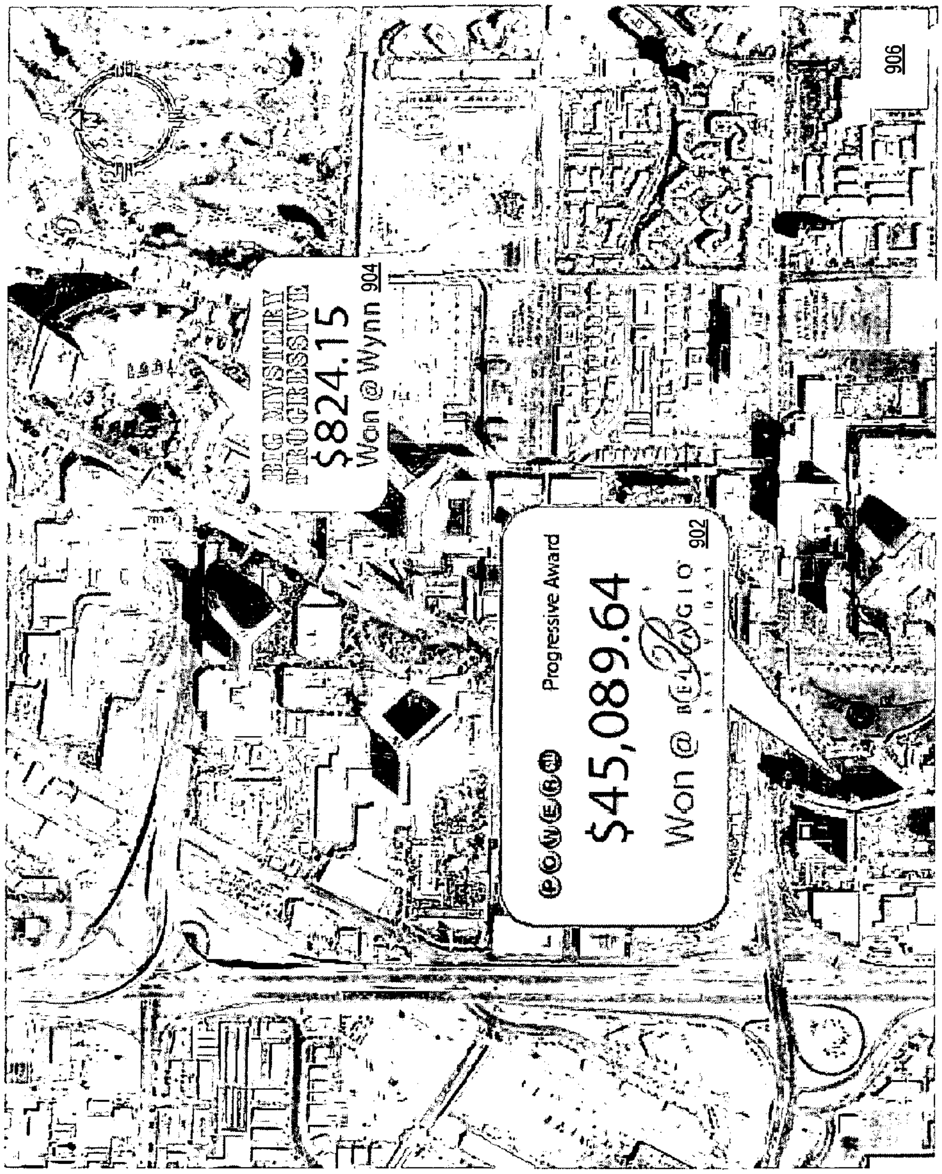
FIG. 9 is an example mashed-up presentation (map) mashing up internally sourced data with a presentation associated with the internally sourced data.

FIG. 9 is an example mashed-up presentation 900 mashing up internally sourced data (wagering game winning events 902, 904) with a presentation (e.g., geographical map) 906 associated with internally sourced data. As illustrated in the example mashed-up map 900, a progressive award of $45,089 in Power Ball™ progressive game was won at the Bellagio casino in Las Vegas and an award of $824 in a big mystery progressive game was won at the Wynn casino in Las Vegas. It is noted that a wide variety of mashed-up presentations may be presented as described herein (e.g., geographical maps, casino floor maps, various charts, and the like), which include a wide array of data in addition to the award amount, wagering game and location shown in mashed-up presentation 900. For example, internally sourced data (e.g., wagering game winning event) may be mashed-up with a photo of a winning player obtained from a player-designated universal resource locator (URL) on the Internet. Alternatively, the player photo could be obtained via a camera at a gaming device 106. If the internally sourced data (e.g., wagering game winning event) is a progressive jackpot, for example, the jackpot amount could even be shown on a large check superimposed over the player's photo (e.g., player holding a big check). Many other mash-up scenarios of internally sourced data and presentations may be envisioned.

In the foregoing description, reference is made to specific examples by way of drawings and illustrations. These examples are described in sufficient detail to enable those skilled in the art to practice the inventive subject matter, and serve to illustrate how the inventive subject matter may be applied to various purposes or embodiments. Other embodiments are included as logical, mechanical, electrical, and other changes may be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A mash-up method, the method comprising:

obtaining, by a computer server at a first gaming establishment of a plurality of gamine establishments, real-time gaming data associated with a wagering game event associated with the first gaming establishment;

obtaining, by the computer server, an image of a geographical map depicting the plurality of gaming establishments;

producing, by the computer server, a composite image by overlaying the real-time gaming data associated with the wagering game event on the image of the geographical map;

transmitting the composite image from the computer server to a first display device at the first gaming establishment;

determining, by the computer server, whether to share the composite image with a second gaming establishment of the plurality of gaming establishments;

based on the determination, transmitting the composite image from the computer server to the second gaming establishment;

updating, by the computer server, the composite image based on further real-time data to produce an updated composite image; and transmitting, by the computer server, the updated composite image to the first and second gaming establishments.

2. The mash-up method of claim 1, wherein obtaining real-time gaming data further comprises receiving information related to a wagering game winning event.

3. The mash-up method of claim 2, wherein obtaining real-time gaming data further comprises determining associated information from information related to a plurality of wagering game events.

4. The mash-up method of claim 1, wherein the real-time gaming data associated with the wagering game event is selected from the group consisting of: a real time wagering game winning event; a historical wagering game winning event; frequency of wagering game winning events; non-occurrence of a wagering game winning event; location hot areas; actual payback percentages; and promotional event information.

5. A non-transitory machine-readable medium including instructions, which when executed by a gaming system, cause the gaming system to perform the steps of:

obtaining, at a first gaming establishment of a plurality of gaming establishments, real-time gaming data associated with a wagering game event associated with the first gaming establishment;

obtaining an image of a geographical map depicting the plurality of gaming establishments;

producing a composite image by overlaying the real-time gaming data associated with the wagering game event on the image of the geographical map;

transmitting the composite image from the gaming system to a first display device at the first gaming establishment;

determining whether to share the composite image with a second gaming establishment of the plurality of gaming establishments;

based on the determination, transmitting the composite image from the gaming system to the second gaming establishment;

updating the composite image based on further real-time data to produce an updated composite image; and transmitting the updated composite image to the first and second gaming establishments.

6. The non-transitory machine-readable medium of claim 5, wherein the instructions causing the gaming system to obtain the real-time gaming data further comprise instructions causing the gaming system to perform the steps of receiving information related to a wagering game winning event.

7. The mash-up method of claim 2, wherein the image of the geographical map includes a geographical map of the first gambling establishment and surrounding area, the image of the map including a graphical annotation that provides a visual correlation between the first gambling establishment and the wagering game winning event and further provides information of the wagering game winning event.

8. The mash-up method of claim 1, wherein the first display device is part of a wagering game machine.

9. The mash-up method of claim 1, wherein the first display device includes a community display.

10. The mash-up method of claim 1, wherein obtaining real-time gaming data comprises receiving data regarding a jackpot winning event.

11. The mash-up method of claim 1, wherein determining, by the computer server, whether to share the composite image with another gaming establishment comprises determining a winning event amount of the wagering game event, and wherein whether to share the composite image is based on the winning event amount.

12. The mash-up method of claim 1, wherein determining, by the computer server, whether to share the composite image with another gaming establishment comprises:

determining a winning event amount of the wagering game event; and based on the winning event amount, determining whether to share the composite image with gaming establishments of the plurality of gaming establishments located within a predetermined number of miles of the first gaming establishment.

13. The mash-up method of claim 1, wherein transmitting the composite image from the computer server to the second gaming establishment comprises:

transmitting the composite image from the computer server to a server at the second gaming establishment.

14. The non-transitory machine-readable medium of claim 5, wherein the instructions causing the gaming system to obtain real-time gaming data further comprise instructions causing the gaming system to perform the steps of receiving data regarding a jackpot winning event.

15. The non-transitory machine-readable medium of claim 5, wherein the instructions causing the gaming system to determine whether to share the composite image further comprise instructions causing the gaming system to perform the steps of:

determining a winning event amount of the wagering game event; and based on the winning event amount, determining whether to share the composite image with the second gaming establishment.

16. The non-transitory machine-readable medium of claim 5, wherein the instructions causing the machine to determine whether to share the composite image further comprise instructions causing the gaming system to perform the steps of:

determining a winning event amount of the wagering game event; and based on the winning event amount, determining whether to share the composite image with gaming establishments of the plurality of gaming establishments located within a predetermined number of miles of the first gaming establishment.

17. The non-transitory machine-readable medium of claim 5, wherein the instructions causing the gaming system to transmit the composite image from the gaming system to the second gaming establishment comprise instructions causing the gaming system to perform the steps of:

transmitting the composite image from the gaming system to a server at the second gaming establishment.

18. A mash-up system at a first gaming establishment, the system comprising:

at least one computer processor;

instructions stored on a non-transitory medium that, when executed by the at least one computer processor, cause the mash-up system to perform the steps of:

obtaining, at a first gaming establishment of a plurality of gaming establishments, real-time gaming data associated a wagering game event associated with the first gaming establishment;

obtaining an image of a geographical map depicting the plurality of gaming establishments;

producing a composite image by overlaying the real-time data associated with the wagering game event on the image of the geographical map;

transmitting the composite image from the mash-up system to a first display device at the first gaming establishment;

determining whether to share the composite image with a second gaming establishment of the plurality of gaming establishments; and based on the determination, transmitting the composite image from the mash-up system to the second gaming establishment;

wherein the mash-up system updates the composite image based on further real-time data to produce an updated composite image, and transmits the updated composite image to the first and second gaming establishments.

* * * * *